(12) United States Patent
Fandrei, II

(10) Patent No.: US 9,313,832 B2
(45) Date of Patent: Apr. 12, 2016

(54) METHOD AND SYSTEM FOR LOCALIZED HEAT TREATING USING SUSCEPTOR

(71) Applicant: GENERAL ELECTRIC COMPANY, Schenectary, NY (US)

(72) Inventor: Theodore William Fandrei, II, Latham, NY (US)

(73) Assignee: HARSCO CORPORATION, Camp Hill, PA (US)

( * ) Notice: Subject to any disclaimer, the term of this patent is extended or adjusted under 35 U.S.C. 154(b) by 510 days.

(21) Appl. No.: 13/656,982

(22) Filed: Oct. 22, 2012

(65) Prior Publication Data

US 2014/0110401 A1  Apr. 24, 2014

(51) Int. Cl.
*H05B 6/10* (2006.01)
*B29C 33/06* (2006.01)

(52) U.S. Cl.
CPC ............... *H05B 6/105* (2013.01); *B29C 33/06* (2013.01)

(58) Field of Classification Search
CPC ......... H05C 6/10–6/109; B29C 33/06–33/065; B29C 35/08–35/0805; B29C 2035/0811
USPC .......................................................... 219/634
See application file for complete search history.

(56) References Cited

U.S. PATENT DOCUMENTS

| 6,884,975 | B2 | 4/2005 | Matsen et al. | |
|---|---|---|---|---|
| 7,901,523 | B2 * | 3/2011 | Silvia et al. | 148/559 |
| 2002/0170664 | A1 * | 11/2002 | Ryu | 156/272.6 |
| 2009/0126838 | A1 | 5/2009 | Silvia et al. | |

* cited by examiner

*Primary Examiner* — Sang Y Paik
(74) *Attorney, Agent, or Firm* — McNees Wallace & Nurick

(57) ABSTRACT

A system or method for heat treating a localized area of a component part includes providing a susceptor, shaping the susceptor to conform to the component part, a component part, and a heat source, heating the susceptor by the heat source, and introducing the susceptor to the desired target area of the component part for a controlled or predetermined interval as necessary to achieve a desired metallurgical effect to take place with respect to the desired target area.

11 Claims, 2 Drawing Sheets

METHOD AND SYSTEM FOR LOCALIZED HEAT TREATING USING SUSCEPTOR

FIELD OF THE INVENTION

The application generally relates to a method and system for heat treating using a susceptor. The application relates more specifically to a method and system for heat treating a localized portion of a component such as an airfoil as may be employed in power generation systems.

BACKGROUND OF THE INVENTION

When hardening or tempering complex shapes such as airfoils, especially for localized treatments, conventional methods such as direct flame impingement hardening or direct induction can locally overheat areas impacting material properties by enlarging grain size or localized melting. Areas which contain thin section features in association with thicker sections are particularly vulnerable.

Historically parts have been locally heat treated by a gas flame (often to harden the part, but tempering or softening may also be achieved) or by direct treatment with induction heating methods. This direct or local treatment can be difficult to control especially when the parts have complex shapes with a mix of fine or thin cross sections along with thicker sections.

A susceptor is an apparatus used for the indirect heating of materials such as polymers and ceramics which are not electrically conductive. The susceptor may be heated by induction, or other methods. Heat from the susceptor is then transferred to the target work material by thermal conduction, convection or radiation. A typical susceptor material may include, e.g., graphite, silicon carbide, molybdenum, stainless steels or any thermally conductive material with suitable thermal properties. What is needed is a proper selection of the susceptor material for the heat treatment cycle, an appropriate shape and mass for the susceptor, a method for heating a susceptor to the target temperature and then a means for exposing the susceptor to the component part for the localized heat treatment process.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

BRIEF DESCRIPTION OF THE INVENTION

One embodiment relates to a method for heat treating a localized area of a component part, including providing a susceptor, a component part, and a heat source; shaping the susceptor to include a feature corresponding to a negative impression of a desired target area of the component part; heating the susceptor by the heat source; introducing the susceptor to the desired target area of the component part for a controlled or predetermined interval as is necessary to achieve a desired metallurgical effect to take place with respect to the desired target area.

Another embodiment relates to a heat treating system for heat treating a localized area of a component part. The system includes a susceptor and a heat source. The susceptor includes a body portion having at least one feature formed therein. The feature includes a negative impression of at least a portion of the component part. The susceptor is arranged so as to receive and store heat from the heat source. The susceptor and feature are matingly engageable with a portion of the component part.

Certain advantages of the embodiments described herein are better control of localized heat treatments by: 1) improving the process through utilizing susceptors with shapes which enable complex geometries to be treated; 2) reducing reprocess or scrapped parts; and 3) the avoidance of customer claims and dissatisfaction by delivering parts which perform consistently and avoid outages.

If uncontrolled, localized heating may result in altered metallurgical structures such as improper or incomplete hardening, excursions of the treatment outside the intended treatment area, and coarse or enlarged part grain sizes. Material can also be heated into a zone of incipient or true melting which renders the part unusable. For good performance in service proper thermal treatment (hardening or softening) and grain sizes of the part must be controlled. This heating method helps avoid overheating or under heating by ensuring the susceptor is at the proper temperature before exposing the part to the heat. This method may also be used to selectively soften a part in a local area by using a shaped susceptor and controlling the time and temperature of the thermal treatment.

Alternative exemplary embodiments relate to other features and combinations of features as may be generally recited in the claims.

DETAILED DESCRIPTION OF THE INVENTION

Figure 1:
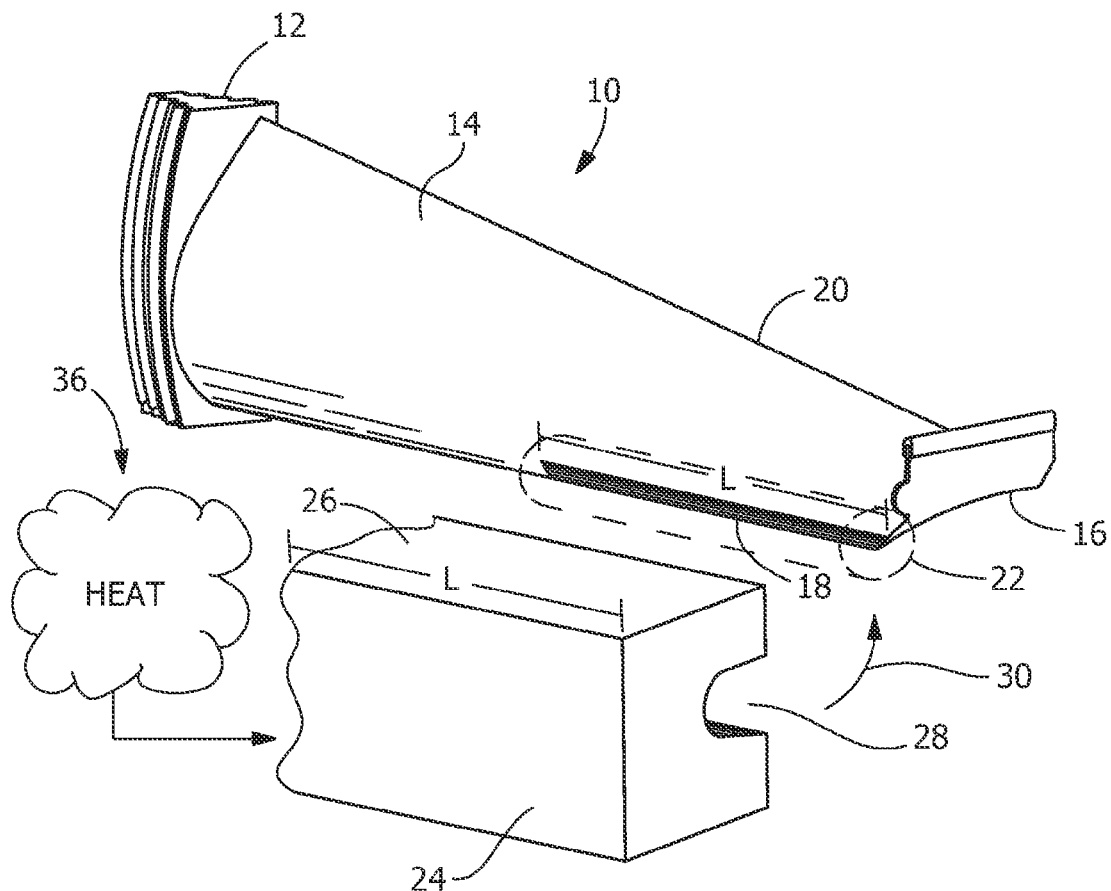
FIG. 1 shows an exemplary embodiment of the susceptor.
Figure 2:
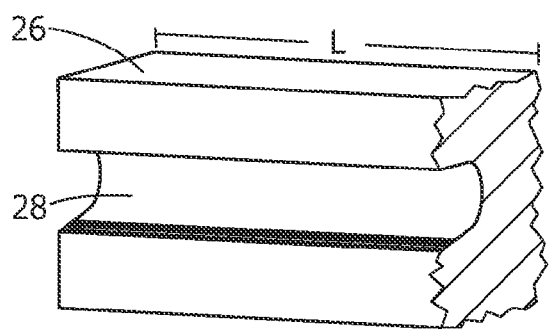
FIG. 2 shows a partial front view of the susceptor.

Referring to FIGS. 1 and 2, a component part of a power generation system, e.g., a turbine blade 10 suitable for heat treating by the disclosed process is illustrated. Turbine blade 10 has a root portion 12, an airfoil portion 14, and a blade tip portion 16 at the radially outer end of the blade 10. The blade also has a leading edge 18 and a trailing edge 20. Leading edge 18 includes a targeted area 22 to which localized heat treatment may be applied. A susceptor 24 may have a heat source 36 associated with it for heating susceptor 24 to a predetermined temperature suitable for heat treatment of targeted area 22 of turbine blade 10. Susceptor 24 is a normally a thermally conductive material which when heated by induction transfers heat from susceptor 24 to another material which may or may not be conductive. It is also possible to heat susceptor 24, including a non-conductive susceptor 24, by other means such as a common gas fired or electric furnace. Susceptor 24 is heated directly or indirectly, e.g., through direct contact heat transfer, or induction heating in which heat is transferred through eddy currents. When it susceptor 24 achieve the desired temperature is introduced to the part being heat treated.

In the exemplary embodiment shown in FIG. 1, susceptor 24 may be formed from a block of material 26, or body, having a groove 28 defined therein. Groove 28 preferably represents a negative impression of leading edge 18 that conforms closely to the irregular geometry of leading edge 18 when susceptor 24 is applied to leading edge 18. Groove 28 receives leading edge 18 in near or direct contact with targeted area 22 to facilitate transfer heat from susceptor 24 to leading edge 18 to heat treat only targeted area 22. Length L of susceptor 24 corresponds to the length L of targeted area 22 on turbine blade 10. Once heated to the desired heat treatment temperature, susceptor 24 is applied or introduced to targeted area 22, as indicated by arrow 30. While in the exemplary embodiment a groove 28 is described, it should be understood that any feature may be substituted for the groove, e.g., a hole or a radius, to provide the negative impression of the heat treated area.

Figure 3:
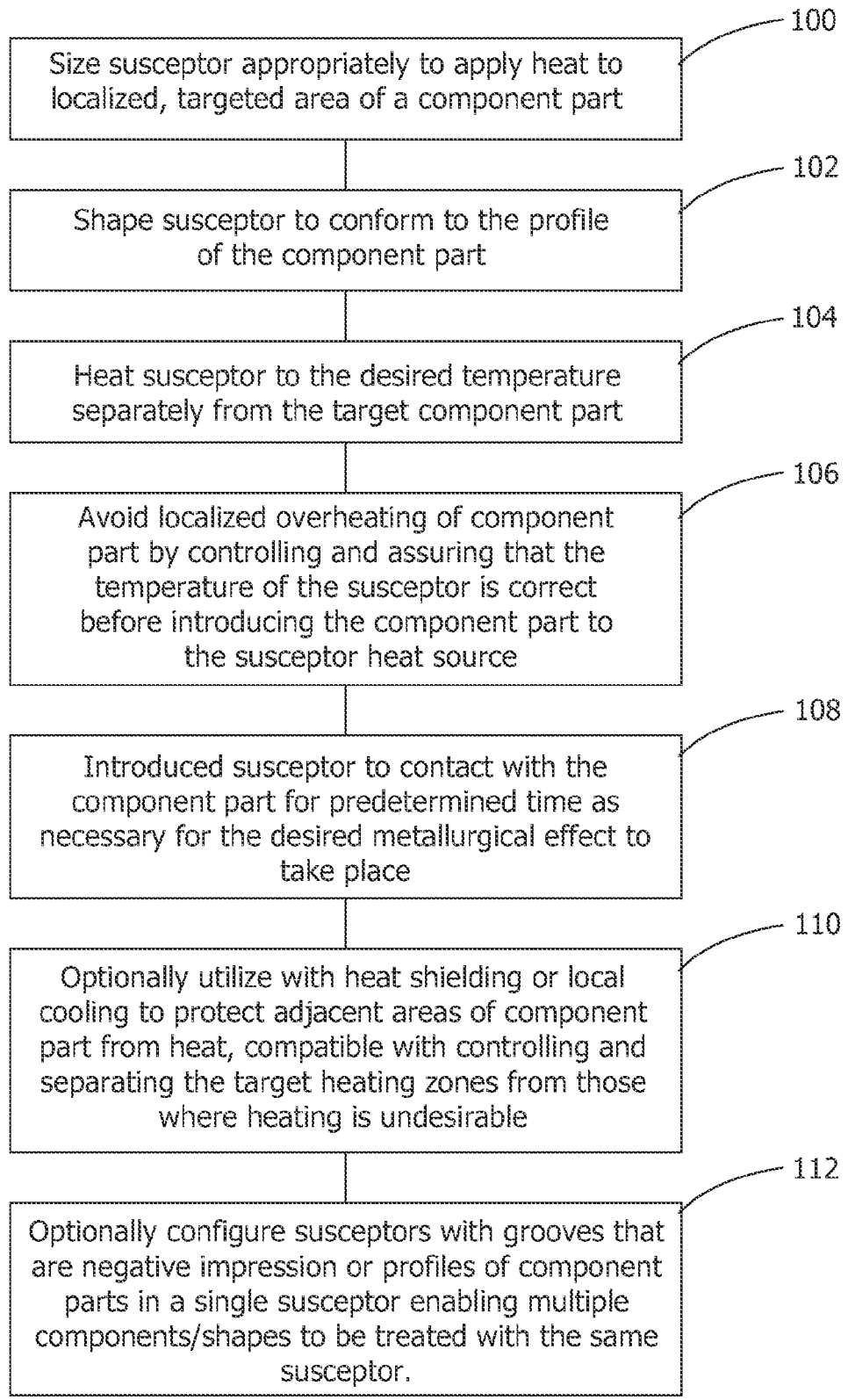
FIG. 3 shows a flow chart of the method of heat treating a component using the susceptor.

FIG. 3 discloses a method for indirect heating of susceptor 24, which when heated transfers thermal energy to component part 10 by convection, radiation or conduction. Susceptor 24 may be shaped to matingly engage with the targeted area. To engage the targeted area the susceptor and the part may be, but are not required to be, in direct contact. Susceptor 24 may be formed from a metal or non-metal material, for example, graphite, silicon carbide, molybdenum, stainless steel, or other conductive alloys or non-conductive materials. Susceptor materials may be selected based on processing needs and costs for the application. Susceptor 24 is then heated to the desired temperature and introduced closely to component part 10 for a sufficient interval of time to produce the desired effect, e.g., hardening thru metallurgical transformation (followed by appropriate cooling to complete the process of transformation) or softening thru tempering. Component part 10 may be protected from the application of heat outside the targeted heating zone by methods such as positioning the component in a water bath to minimize heat transmission from susceptor 24 to areas of component part 10 that not targeted for heat treating. Chill blocks, fluid sprays, heat shielding or other localized insulation methods may also be used to prevent heat transmission beyond targeted area 22.

In one exemplary embodiment, susceptor 24 may be heated by induction methods. Other suitable methods of heating may be used to heat the susceptor within the scope of the appended claims. Once heated by susceptor 24 for the prescribed time and temperature, component part 10 may be cooled appropriately to complete the desired metallurgical effect.

In an embodiment, susceptor 24 may be designed such that multiple parts may be aligned in groupings to more efficiently treat multiple components simultaneously.

Referring next to FIG. 3, a method of utilizing the heat treating capability of a susceptor is described as follows. At step 104, susceptor 24 is heated separately from the component part 10, until susceptor 24 reaches the desired heat treat temperature. At step 108, susceptor is introduced to the target part for a controlled or predetermined time as is necessary to achieve a desired metallurgical effect to take place with respect to target area 22. An optional step 110 may be to utilize susceptor 24 in conjunction with heat shielding or local cooling to protect areas of component part 10 that are adjacent to target area 22 from being heat treated inadvertently. In other words, susceptor 24 is compatible with controlling and separating the target area or heating zones of component part 10 from areas of component part 10 where heat treating is not intended. At step 112, a single susceptor may be designed to include multiple grooves or shapes in conformity with target area 22 profiles of component parts 10 to enable multiple component parts or multiple shapes to be treated with the same susceptor.

It should be understood that the application is not limited to the details or methodology set forth in the following description or illustrated in the figures. It should also be understood that the phraseology and terminology employed herein is for the purpose of description only and should not be regarded as limiting.

While the exemplary embodiments illustrated in the figures and described herein are presently preferred, it should be understood that these embodiments are offered by way of example only. Accordingly, the present application is not limited to a particular embodiment, but extends to various modifications that nevertheless fall within the scope of the appended claims. The order or sequence of any processes or method steps may be varied or re-sequenced according to alternative embodiments.

It is important to note that the construction and arrangement of the susceptor heat treating system as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

What is claimed is:

1. A method for heat treating a localized area of a component part, comprising:
   providing a susceptor, a component part, and a heat source;
   shaping the susceptor to include a feature corresponding to a negative impression of a desired target area of the component part;
   heating the susceptor by the heat source separately from the component part;
   controlling the temperature of the susceptor to a predetermined temperature suitable for heat treatment of the desired target area of the component part prior to introducing the susceptor to the component part; and
   applying the susceptor to the desired target area of the component part after the susceptor reaches the predetermined temperature for a controlled or predetermined interval as is necessary to achieve a desired metallurgical effect to take place with respect to the desired target area.

2. The method of claim 1, wherein shaping comprises shaping the susceptor to conform to the component part.

3. The method of claim 1, wherein shaping comprises shaping the susceptor as a negative impression of least a portion of a profile of the component part.

4. The method of claim 1, further comprising sizing the susceptor for heating a desired target area of the component part.

5. The method of claim 4, wherein heating is achieved without affecting properties of the component part adjacent to the targeted area.

6. The method of claim 1, further comprising applying heat shielding to areas of the component part adjacent to the target area.

7. The method of claim 1, further comprising applying local cooling to areas of the component part adjacent to the target area.

8. The method of claim 1, further comprising controlling and separating the target area of the component part from an adjacent area of component part in which heat treating is not intended.

9. The method of claim 1, further comprising providing a plurality of grooves in the susceptor, each groove comprising a negative impression of a target area of a plurality of component parts.

10. The method of claim 9, wherein the plurality of component parts is heat treated with the susceptor.

11. The method of claim 9, wherein multiple shapes are treated with the susceptor.

* * * * *